United States Patent [19]
Biro et al.

[11] Patent Number: 5,661,596
[45] Date of Patent: Aug. 26, 1997

[54] ANTIREFLECTION FILM AND EXPOSURE APPARATUS USING THE SAME

[75] Inventors: Ryuji Biro; Kenji Ando, both of Kawasaki; Yasuyuki Suzuki, Yokohama, all of Japan

[73] Assignee: Canon Kabushiki Kaisha, Tokyo, Japan

[21] Appl. No.: 383,356

[22] Filed: Feb. 3, 1995

[30] Foreign Application Priority Data

Feb. 3, 1994 [JP] Japan .................................. 6-011749
Feb. 3, 1994 [JP] Japan .................................. 6-011750
Nov. 11, 1994 [JP] Japan .................................. 6-277831

[51] Int. Cl.⁶ .................................. F21V 9/04; G02B 5/08; G02B 1/10; G02B 5/28
[52] U.S. Cl. .................................. 359/359; 359/361; 359/586; 359/588; 359/589
[58] Field of Search .................................. 359/350, 359, 359/361, 580, 584, 586, 585, 587, 588, 589, 590

[56] References Cited

U.S. PATENT DOCUMENTS

| | | | |
|---|---|---|---|
| 4,196,246 | 4/1980 | Takayama et al. | 359/588 |
| 4,805,989 | 2/1989 | Nakajima | 359/359 |
| 5,381,210 | 1/1995 | Hagiwara | 355/53 |
| 5,408,489 | 4/1995 | Kügler et al. | 359/361 |
| 5,457,570 | 10/1995 | Lu et al. | 359/361 |

FOREIGN PATENT DOCUMENTS 61-77002  4/1986  Japan .

Primary Examiner—Paul M. Dzierzynski
Assistant Examiner—Audrey Chang
Attorney, Agent, or Firm—Fitzpatrick, Cella, Harper & Scinto

[57] ABSTRACT

This specification discloses antireflection film and an exposure apparatus using the same. The exposure apparatus has an optical system, and antireflection film formed on the refracting surface of the optical system, the antireflection film having a high refractive index layer having $Al_2O_3$ or $Ta_2O_5$ and a low refractive index layer having $SiO_2$.

7 Claims, 19 Drawing Sheets

ANTIREFLECTION FILM AND EXPOSURE APPARATUS USING THE SAME

BACKGROUND OF THE INVENTION

1. Field of the Invention

This invention relates to antireflection film, and particularly antireflection film effective for near ultraviolet light, visible light, etc.

2. Related Background Art

Conventional antireflection film for near ultraviolet light is provided with a high refractive index layer and a low refractive index layer formed of a fluoride, and is disclosed, for example, in Japanese Laid-Open Patent Application No. 61-77002.

The antireflection film of the above-mentioned publication is provided with an excellent antireflection characteristic, but is not designed for near ultraviolet light of wavelengths 200–400 nm or wavelengths 300–400 nm and therefore, may create unnegligible optical absorption for near ultraviolet light of wavelengths 200–400 nm or wavelengths 300–400 nm.

SUMMARY OF THE INVENTION

So, it is a primary object of the present invention to provide antireflection film which is small in optical absorption and which has an excellent antireflection characteristic.

One form of the antireflection film of the present invention for achieving this object is antireflection film used for light of wavelengths of 200 nm to 400 nm, and which is characterized by a high refractive index layer having $Ta_2O_5$ and a low refractive index layer having $SiO_2$.

When the refractive indices of said low refractive index layer and said high refractive index layer for light of wavelength 365 nm are $N_L$ and $N_H$, respectively, it is preferable to satisfy the following conditions:

$1.42 \leq N_L \leq 1.50$ $2.10 \leq N_H \leq 2.40$

It is preferable for the antireflection film to have a plurality of alternate layers comprising said low refractive index layer and said high refractive index layer in succession from the air side to the substrate side.

Another form of the antireflection film of the present invention is antireflection film used for light of wavelengths 200 nm to 400 nm, and which has four-layer structure, and which is characterized in that of said four layers, first and third layers in succession from the air side are low refractive index layers having $SiO_2$ and second and fourth layers are high refractive index layers having $Ta_2O_5$, and when the optical film thicknesses (refractive index×geometrical film thickness, measured in nanometers) of said first to fourth layers are D1, D2, D3 and D4, respectively, the following conditions are satisfied:

$74 \leq D1 \leq 112$ $85 \leq D2 \leq 128$ $15 \leq D3 \leq 31$ $27 \leq D4 \leq 47$ Another form of the antireflection film of the present invention is antireflection film used for light of wavelengths 200 nm to 400 nm, and which has six-layer structure, and which is characterized in that of said six layers, first and third layers in succession from the air side are low refractive index layers having $SiO_2$, second, fourth and sixth layers are high refractive index layers having $Ta_2O_5$, and a fifth layer is a layer having $Al_2O_3$.

It is preferable that the refractive index $N_M$ of said fifth layer satisfy $1.59 \leq N_M \leq 1.65$.

When the optical film thicknesses (refractive index× geometrical film thickness) of said first to sixth layers are D1, D2, D3, D4, D5 and D6, respectively, it is preferable to satisfy the following conditions:

$80 \leq D1 \leq 128$ $52 \leq D2 \leq 88$ $11 \leq D3 \leq 20$ $112 \leq D4 \leq 172$ $20 \leq D5 \leq 42$ $22 \leq D6 \leq 38$ One form of the exposure apparatus of the present invention is an exposure apparatus using exposure light of wavelengths 200 nm to 400 nm, and which is characterized by an optical system and antireflection film formed on the refracting surface of the optical system, said antireflection film having a high refractive index layer having $Ta_2O_5$, and a low refractive index layer having $SiO_2$.

Another form of the antireflection film of the present invention is antireflection film used for light of wavelengths 200 nm to 400 nm, and which is characterized by a high refractive index layer having $Al_2O_3$ and a low refractive index layer having $SiO_2$.

When the refractive indices of said low refractive index layer and said high refractive index layer for light of wavelength 248 nm are $N_L$ and $N_H$, respectively, it is preferable to satisfy the following conditions:

$1.45 \leq N_L \leq 1.55$ $1.60 \leq N_H \leq 1.80$

It is preferable for the antireflection film to have a plurality of alternate layers comprising said low refractive index layer and said high refractive index layer in succession from the air side to the substrate side.

Another form of the antireflection film of the present invention is antireflection film used for light of wavelengths 200 nm to 400 nm, and which has six-layer structure, and which is characterized in that of said six layers, first, third and fifth layers in succession from the air side are low refractive index layers having $SiO_2$, and second, fourth and sixth layers are high refractive index layers having $Al_2O_3$.

When the optical film thicknesses (refractive index×film thickness) of said first to sixth layers are D1, D2, D3, D4, D5 and D6, respectively, it is preferable to satisfy the following conditions:

$50 \leq D1 \leq 85$ $35 \leq D2 \leq 75$ $45 \leq D3 \leq 75$ $145 \leq D4 \leq 240$ $80 \leq D5 \leq 125$ $75 \leq D6 \leq 120$ Another form of the exposure apparatus of the present invention is an exposure apparatus using exposure light of wavelengths 200 nm to 400 nm, and which is characterized by an optical system and antireflection film formed on the refracting surface of the optical system, said antireflection film having a high refractive index layer having $Al_2O_3$, and a low refractive index layer having $SiO_2$.

The antireflection film of the present invention and the exposure apparatus using the same will hereinafter be described in detail with respect to some embodiments thereof.

DESCRIPTION OF THE PREFERRED EMBODIMENTS

Figure 1:
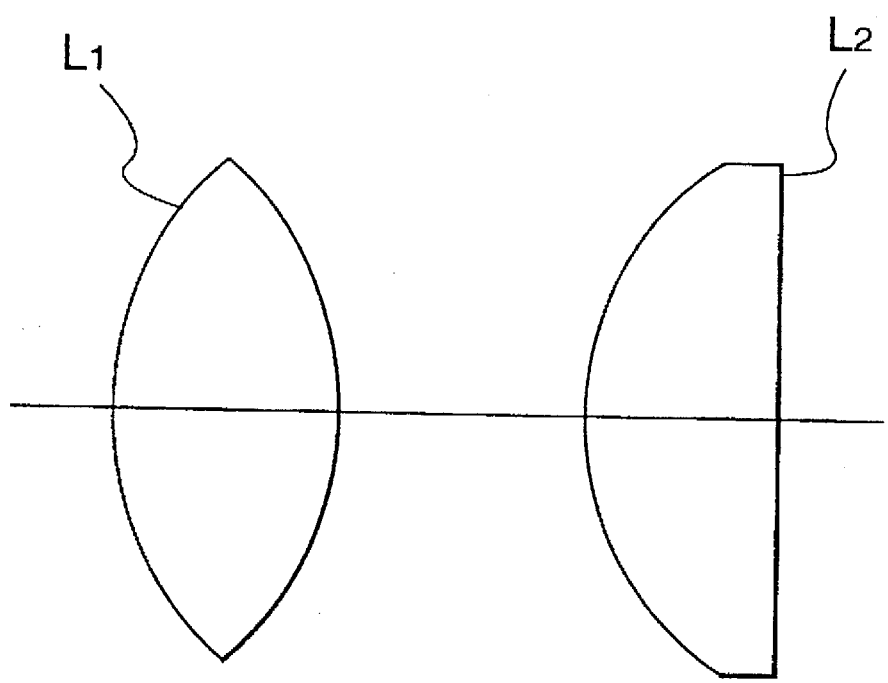
FIG. 1 shows the construction of an optical system provided with antireflection film.

Referring to FIG. 1 which is a schematic view showing an optical system provided with antireflection film, L1 and L2 designate lenses. In FIG. 1, antireflection film is formed on each of the light incidence and emergence surfaces of the lenses L1 and L2. The creation of harmful light such as flare light is suppressed by the antireflection effect of this antireflection film.

Some specific embodiments of the antireflection film will hereinafter be described.

<Embodiment 1>

Figure 2:
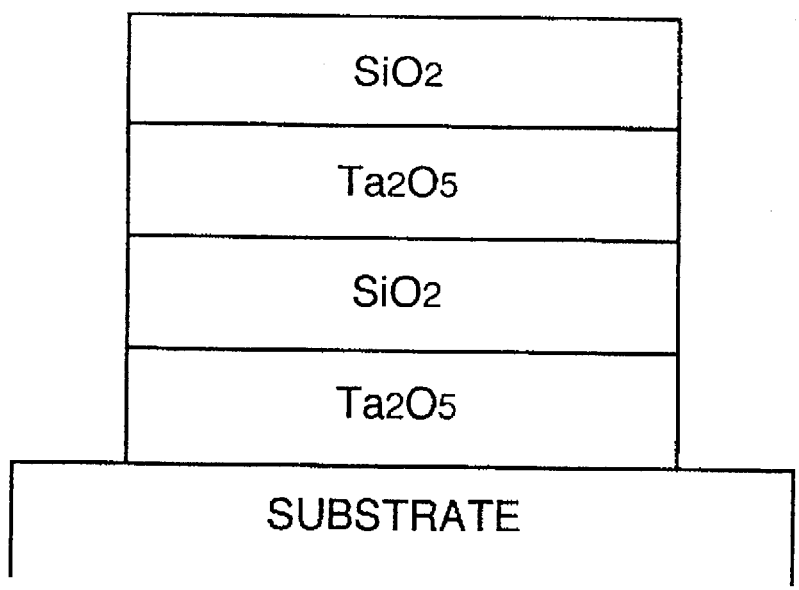
FIG. 2 shows the construction of antireflection film according to a first embodiment of the present invention.

FIG. 2 shows the construction of the antireflection film. In succession from the air side to the substrate side, first and third layers are low refractive index layers having $SiO_2$, and second and fourth layers are high refractive index layers having $Ta_2O_5$.

When the refractive indices of said low refractive index layers and said high refractive index layers for light of wavelength 365 nm are $N_L$ and $N_H$, respectively, this antireflection film is designed to satisfy the following conditions:

$$1.42 \leq N_L \leq 1.50$$

$$2.10 \leq N_H \leq 2.40$$

Further, when the optical film thicknesses (refractive index×geometrical film thickness) of the first to fourth layers are D1, D2, D3 and D4, respectively, this antireflection film is designed to satisfy the following conditions:

$$74 \leq D1 \leq 112$$

$$85 \leq D2 \leq 128$$

$$15 \leq D3 \leq 31$$

$$27 \leq D4 \leq 47$$

In the antireflection film of the present embodiment, $Ta_2O_5$ is used for the high refractive index layers and $SiO_2$ is used for the low refractive index layers, whereby absorption is suppressed and good close contact with the substrate is obtained. Also, this antireflection film is of four-layer structure and therefore is easy to manufacture and can obtain a high antireflection effect.

Figure 4:
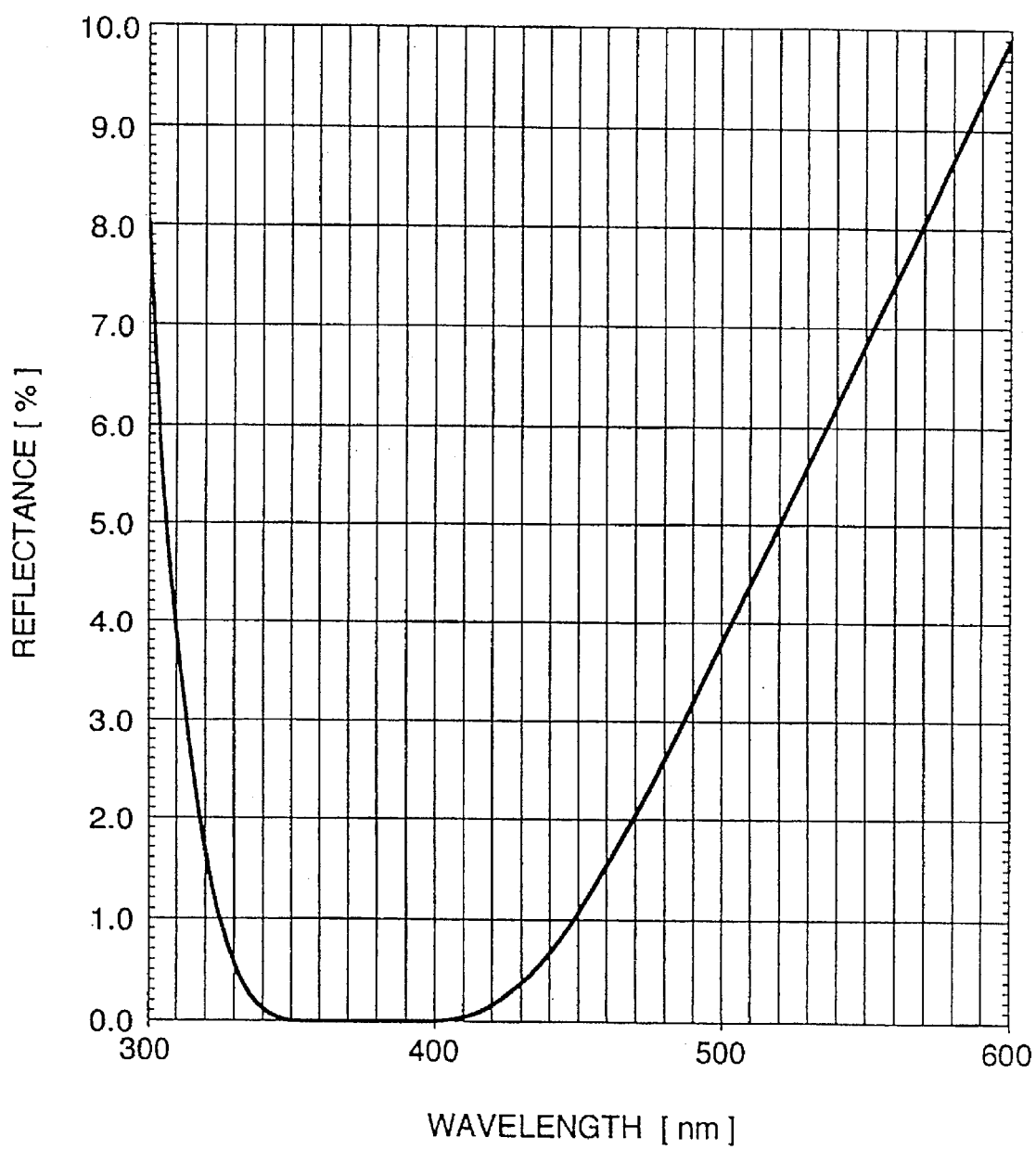
FIG. 4 is a graph showing the reflection characteristic of antireflection film according to a certain design example.

Now, Table 1 below shows a certain design example in which antireflection film for near ultraviolet light of central wavelength 365 nm is formed on BK7 glass substrate by the use of the sputtering method, and values in this table are refractive indices for light of wavelength 365 nm. FIG. 4 is a graph showing the characteristic of the antireflection film prepared in accordance with this design example.

Figure 5:
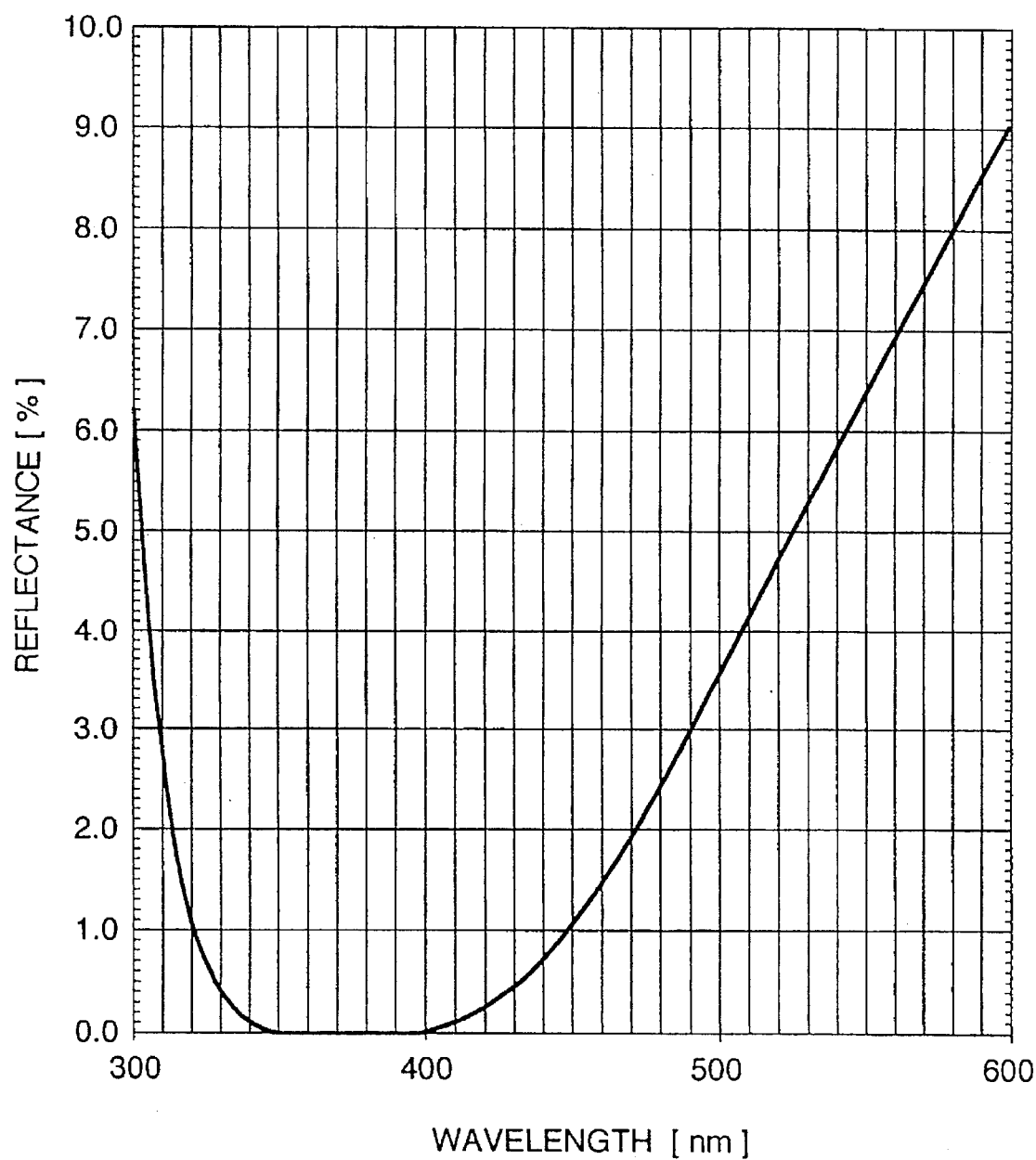
FIG. 5 is a graph showing the reflection characteristic of antireflection film according to another design example.

Also, Table 2 below shows another design example in which antireflection film for near ultraviolet light of central wavelength 365 nm is formed on F2 glass substrate by the use of the vacuum evaporation method, and values in this table are refractive indices for wavelength 365 nm. FIG. 5 is a graph showing the characteristic of the antireflection film prepared in accordance with this design example.

<Embodiment 2>

Figure 3:
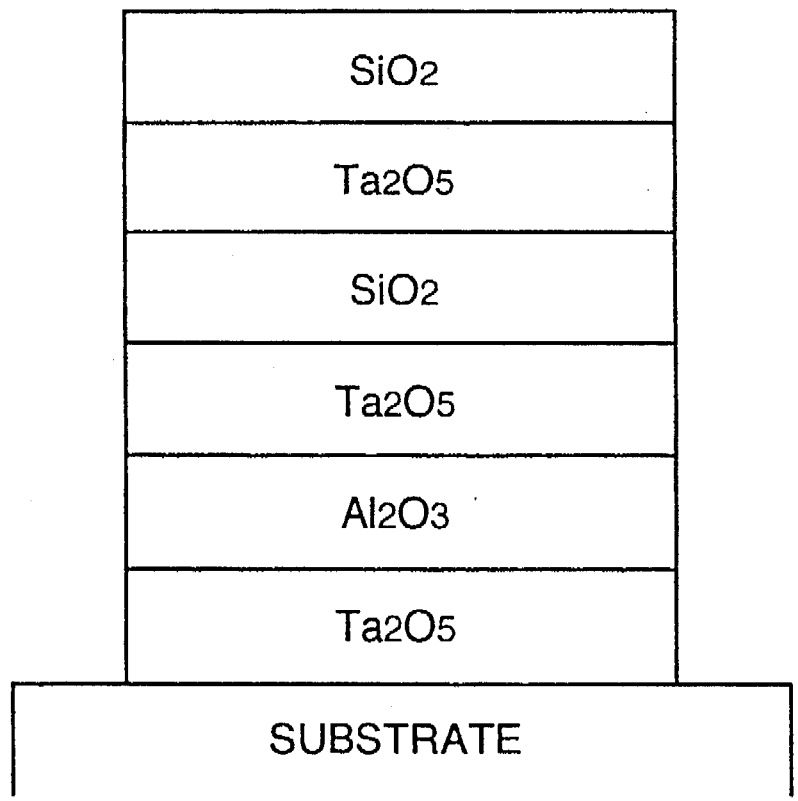
FIG. 3 shows the construction of antireflection film according to a second embodiment of the present invention.

FIG. 3 shows the construction of another embodiment of the antireflection film of the present invention. In the antireflection film of the present embodiment, in succession from the air side to the substrate side, first and third layers are low refractive index layers having $SiO_2$, second, fourth and sixth layers are high refractive index layers having $Ta_2O_5$, and a fifth layer is a layer including $Al_2O_3$.

When the refractive indices of the low refractive index layers and the high refractive index layers for light of wavelength 365 nm are $N_L$ and $N_H$, respectively, and the refractive index of the fifth layer (having $Al_2O_3$) is $N_M$, the antireflection film of the present embodiment is designed to satisfy the following conditions:

$$1.42 \leq N_L \leq 1.50 \tag{1}$$

$$2.10 \leq N_H \leq 2.40 \tag{2}$$

$$1.59 \leq N_M \leq 1.65 \tag{3}$$

Further, when the optical film thicknesses (refractive index×geometrical film thickness) of the first to sixth layers are D1, D2, D3, D4, D5 and D6, respectively, the antireflection film of the present embodiment is designed to satisfy the following conditions:

$$80 \leq D1 \leq 128 \quad (4)$$

$$52 \leq D2 \leq 88 \quad (5)$$

$$11 \leq D3 \leq 20 \quad (6)$$

$$112 \leq D4 \leq 172 \quad (7)$$

$$20 \leq D5 \leq 42 \quad (8)$$

$$22 \leq D6 \leq 38 \quad (9)$$

The antireflection film of the present embodiment uses $Ta_2O_5$ for the high refractive index layers and $SiO_2$ for the low refractive index layers to thereby make optical absorption small. These materials are also excellent in close contact with the substrate. Also, the antireflection film of the present embodiment has six-layer structure and therefore can make optical absorption small and yet can obtain a good antireflection effect.

Particularly, D1, D2, D3, D4, D5 and D6 satisfy the above-mentioned conditions, whereby the antireflection film of the present embodiment realizes a very low reflectivity of the order of 0.1% for near ultraviolet light of wavelengths 300 nm–400 nm, and a low reflectivity of the order of fractional % also for visible light of wavelengths 550 nm–650 nm.

Also, $Al_2O_3$ is used for the fifth layer, whereby the blur created by the chemical reaction of a metallic element constituting the substrate and moisture in the atmosphere can be effectively prevented. The antireflection film may create a blur therein if it is left in the atmosphere for a long period, depending on the combination of the film construction thereof and the substrate. This blur is liable to occur in the substrate under high humidity, and once it occurs, it will result in the decreased transmittance of light not only in the visible light range but also in the near ultraviolet light range and thus, the function of the antireflection film which is directed to an improvement in transmittance will be lost. The $Al_2O_3$ film of the fifth layer is provided to prevent this.

The $Al_2O_3$ film can be at least one layer. In the film forming process such as sputtering, the film forming speed of the $Al_2O_3$ film is lower than that of the $Ta_2O_5$ film or the $SiO_2$ film.

Further, an antireflection characteristic can be more easily obtained in a case where the $Al_2O_3$ film is replaced by the $SiO_2$ film than in a case where the $Al_2O_3$ film is replaced by the $Ta_2O_5$ film, in the antireflection film.

From these reasons and the like, only the fifth layer film is changed into $Al_2O_3$ film to thereby improve the productivity and antireflection performance.

Also, by design being made so as to satisfy the aforementioned conditions (4)–(9), it is possible to obtain an antireflection effect for both of near ultraviolet light and visible light and further, widen the antireflection band in the near ultraviolet light area.

Specific design examples of the antireflection film of the present embodiment are shown in Tables 3 to 6 below.

Figure 6:
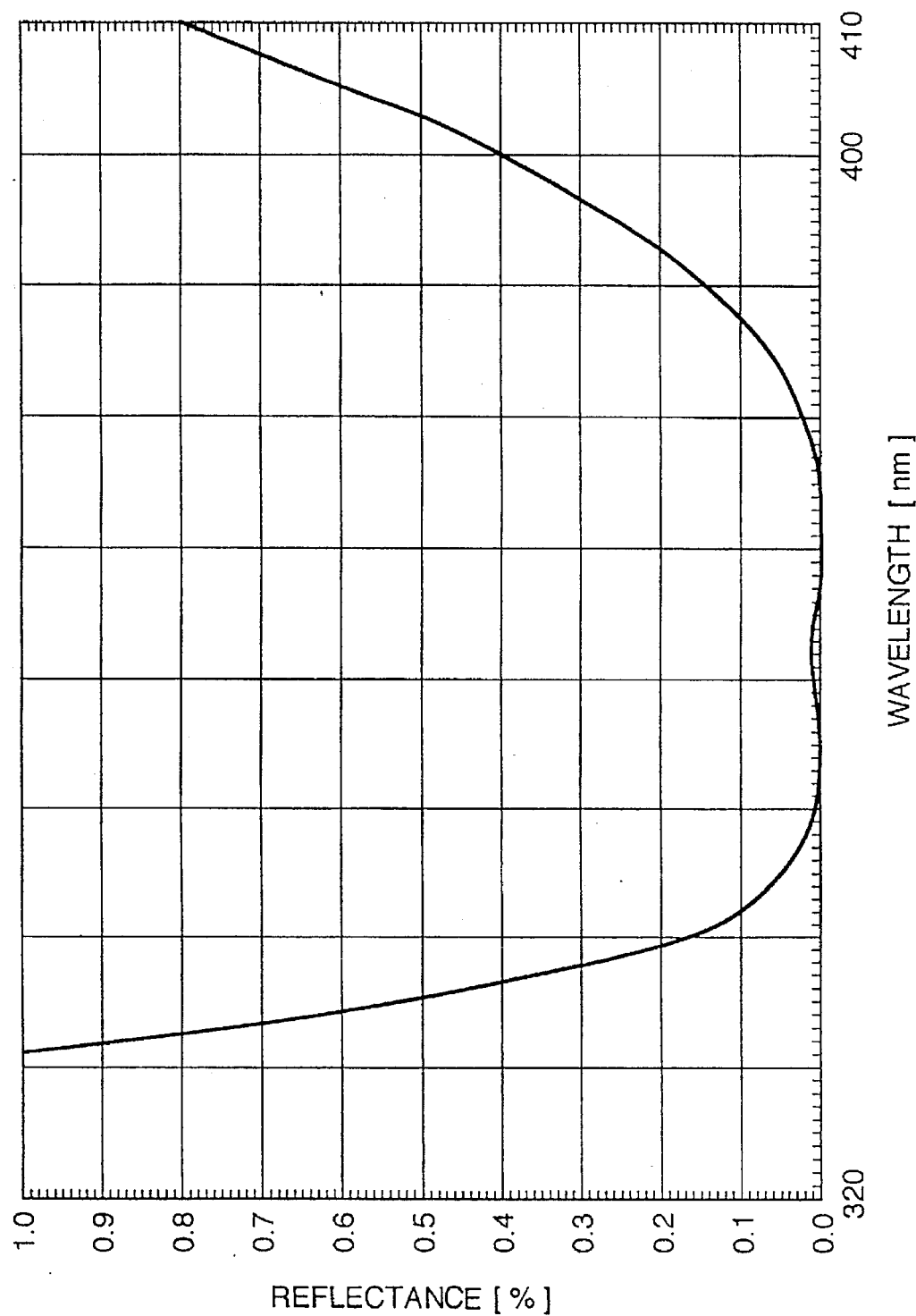
FIG. 6 is a graph showing the reflection characteristic of antireflection film according to another design example.

Table 3 shows a design example in which antireflection film for near ultraviolet light of central wavelength 365 nm is formed on BK7 glass substrate by the use of the sputtering method, and values in Table 3 are refractive indices for light of wavelength 365 nm. FIG. 6 is a graph showing the reflection characteristic in this design example.

Figure 7:
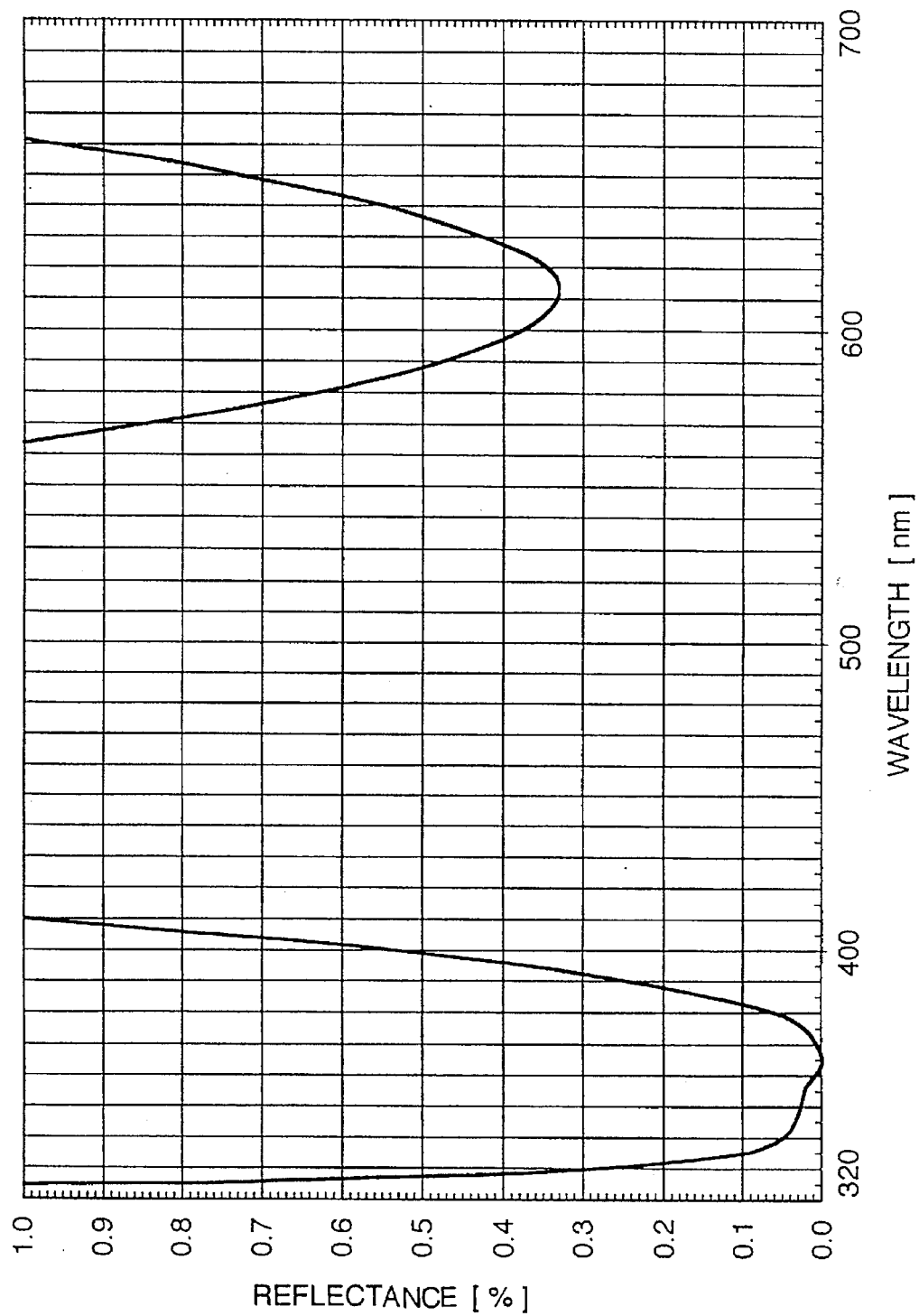
FIG. 7 is a graph showing the reflection characteristic of antireflection film according to another design example.

Table 4 shows a design example in which antireflection film for near ultraviolet light of central wavelength 365 nm and visible light of wavelengths 550–650 nm is formed on BK7 glass substrate by the use of the sputtering method, and values in Table 4 are refractive indices for light of wavelength 365 nm. FIG. 7 is a graph showing the reflection characteristic in this design example.

Figure 8:
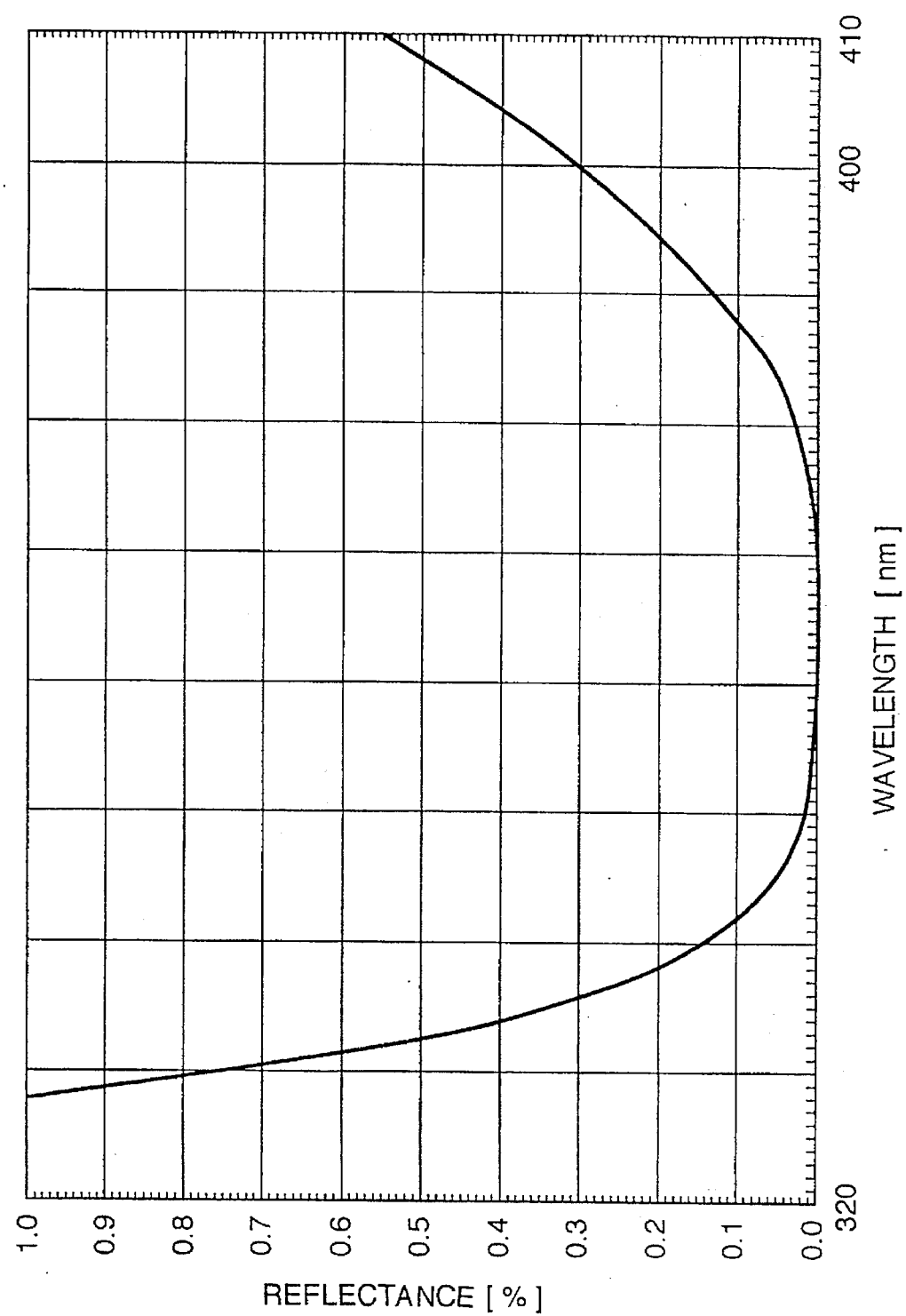
FIG. 8 is a graph showing the reflection characteristic of antireflection film according to another design example.

Table 5 shows a design example in which antireflection film for near ultraviolet light of central wavelength 365 nm is formed on F8 glass substrate by the use of the sputtering method, and values in Table 5 are refractive indices for light of wavelength 365 nm. FIG. 8 is a graph showing the reflection characteristic in this design example.

Figure 9:
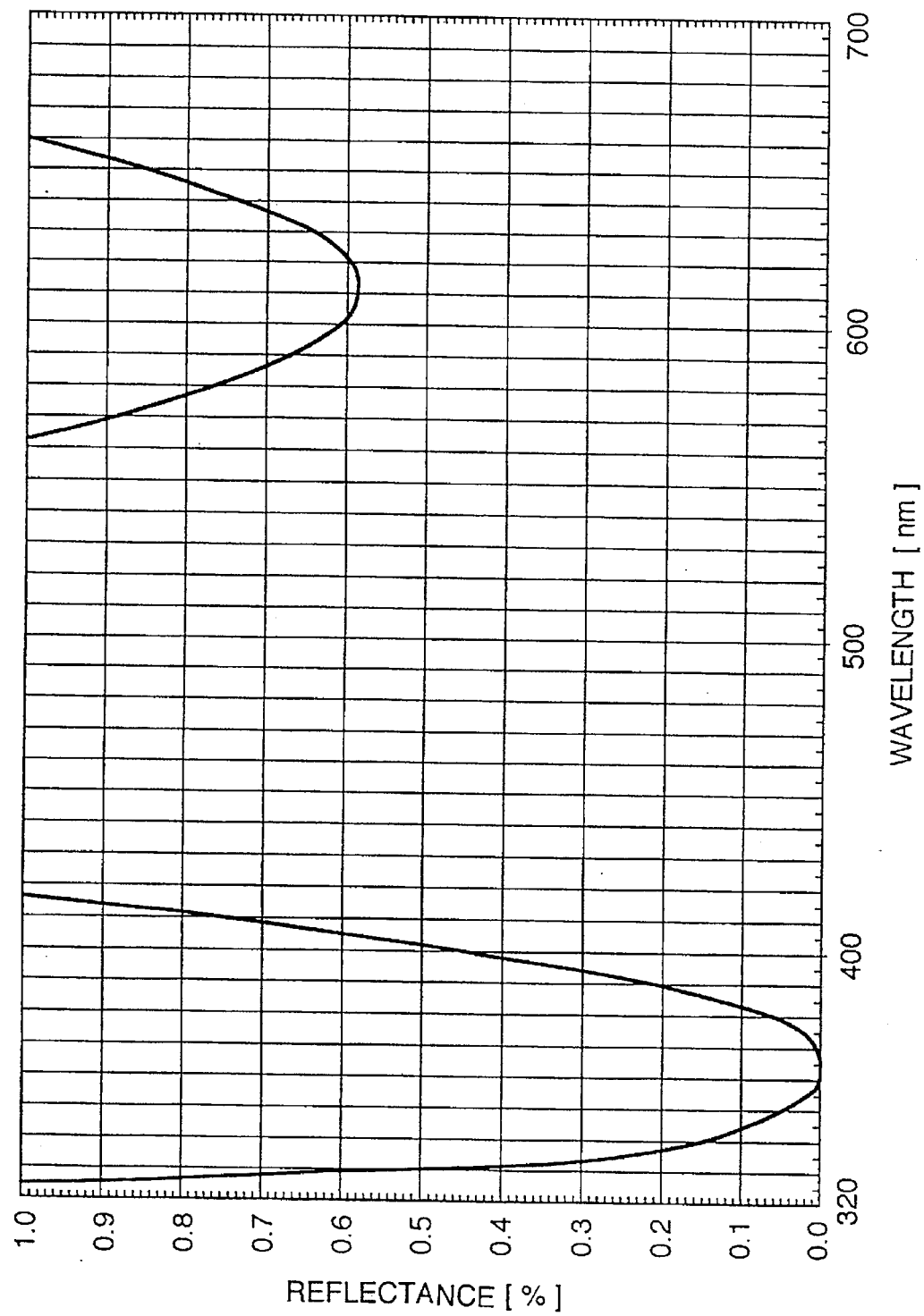
FIG. 9 is a graph showing the reflection characteristic of antireflection film according to another design example.

Table 6 shows a design example in which antireflection film for near ultraviolet light of central wavelength 365 nm and visible light of wavelengths 550–650 nm is formed on F8 glass substrate by the use of the sputtering method, and values in Table 6 are refractive indices for light of wavelength 365 nm. FIG. 9 is a graph showing the reflection characteristic in this design example.

The antireflection films of the design examples of Tables 3 to 6 have a good antireflection effect as shown in the graphs of FIGS. 6 to 9. Also, $SiO_2$, $Ta_2O_5$ and $Al_2O_3$ are used as the materials and moreover, the six-layer structure makes optical absorption small. These materials are also good in close contact with the substrate.

Now, as methods of forming the above-described $Ta_2O_{51}$ film, $Al_2O_3$ film and $SiO_2$ film, mention may be made of the vacuum evaporation method and the sputtering method, but in any of these film forming methods, some impurities will mix during the film formation. For example, in the sputtering method, nitrogen, argon, iron, nickel, etc. will mix, and it is difficult to obtain $Ta_2O_5$ film, $Al_2O_3$ film and $SiO_2$ film in their truly genuine sense, and the film obtained is film containing those materials. That is, the respective layers of the antireflection film are formed chiefly of $Ta_2O_2$, $Al_2O_3$ and $SiO_2$, but layers which have contained N, Ar, etc. in the process of film formation are also applied. However, the amount of mix of those materials is usually a minute amount and it does not happen that this causes optical absorption, and the antireflection effect is hardly lost due to it.

TABLE 1

| | Material | refractive index | optical film thickness |
|---|---|---|---|
| incidence medium | air | 1.000 | |
| 1st layer | $SiO_2$ | 1.483 | 93.482 |
| 2nd layer | $Ta_2O_5$ | 2.323 | 106.246 |
| 3rd layer | $SiO_2$ | 1.483 | 24.504 |
| 4th layer | $Ta_2O_5$ | 2.323 | 35.771 |
| emergence medium | BK7 | 1.536 | |

TABLE 2

| | Material | refractive index | optical film thickness |
|---|---|---|---|
| incidence medium | air | 1.000 | |
| 1st layer | $SiO_2$ | 1.449 | 93.112 |
| 2nd layer | $Ta_2O_5$ | 2.171 | 106.273 |
| 3rd layer | $SiO_2$ | 1.449 | 18.837 |
| 4th layer | $Ta_2O_5$ | 2.171 | 38.695 |
| emergence medium | F2 | 1.666 | |

TABLE 3

| Material | refractive index | optical film thickness |
|---|---|---|
| incidence medium | air | 1.000 | |
| 1st layer | $SiO_2$ | 1.483 | 102.35 |
| 2nd layer | $Ta_2O_5$ | 2.323 | 80.723 |
| 3rd layer | $SiO_2$ | 1.483 | 13.543 |
| 4th layer | $Ta_2O_5$ | 2.323 | 144.904 |
| 5th layer | $Al_2O_3$ | 1.636 | 32.075 |
| 6th layer | $Ta_2O_5$ | 2.323 | 35.649 |
| emergence medium | BK7 | 1.536 | |

TABLE 4

| Material | refractive index | optical film thickness |
|---|---|---|
| incidence medium | air | 1.000 | |
| 1st layer | $SiO_2$ | 1.483 | 103.936 |
| 2nd layer | $Ta_2O_5$ | 2.323 | 72.392 |
| 3rd layer | $SiO_2$ | 1.483 | 13.275 |
| 4th layer | $Ta_2O_5$ | 2.323 | 139.538 |
| 5th layer | $Al_2O_3$ | 1.636 | 35.342 |
| 6th layer | $Ta_2O_5$ | 2.323 | 29.430 |
| emergence medium | BK7 | 1.536 | |

TABLE 5

| Material | refractive index | optical film thickness |
|---|---|---|
| incidence medium | air | 1.000 | |
| 1st layer | $SiO_2$ | 1.449 | 103.707 |
| 2nd layer | $Ta_2O_5$ | 2.171 | 79.547 |
| 3rd layer | $SiO_2$ | 1.449 | 12.751 |
| 4th layer | $Ta_2O_5$ | 2.171 | 142.650 |
| 5th layer | $Al_2O_3$ | 1.614 | 29.241 |
| 6th layer | $Ta_2O_5$ | 2.171 | 35.656 |
| emergence medium | F8 | 1.633 | |

TABLE 6

| Material | refractive index | optical film thickness |
|---|---|---|
| incidence medium | air | 1.000 | |
| 1st layer | $SiO_2$ | 1.449 | 105.609 |
| 2nd layer | $Ta_2O_5$ | 2.171 | 72.609 |
| 3rd layer | $SiO_2$ | 1.449 | 13.990 |
| 4th layer | $Ta_2O_5$ | 2.171 | 140.874 |
| 5th layer | $Al_2O_3$ | 1.614 | 28.952 |
| 6th layer | $Ta_2O_5$ | 2.171 | 32.130 |
| emergence medium | F8 | 1.633 | |

<Embodiments of Exposure Apparatus>

Figure 10:
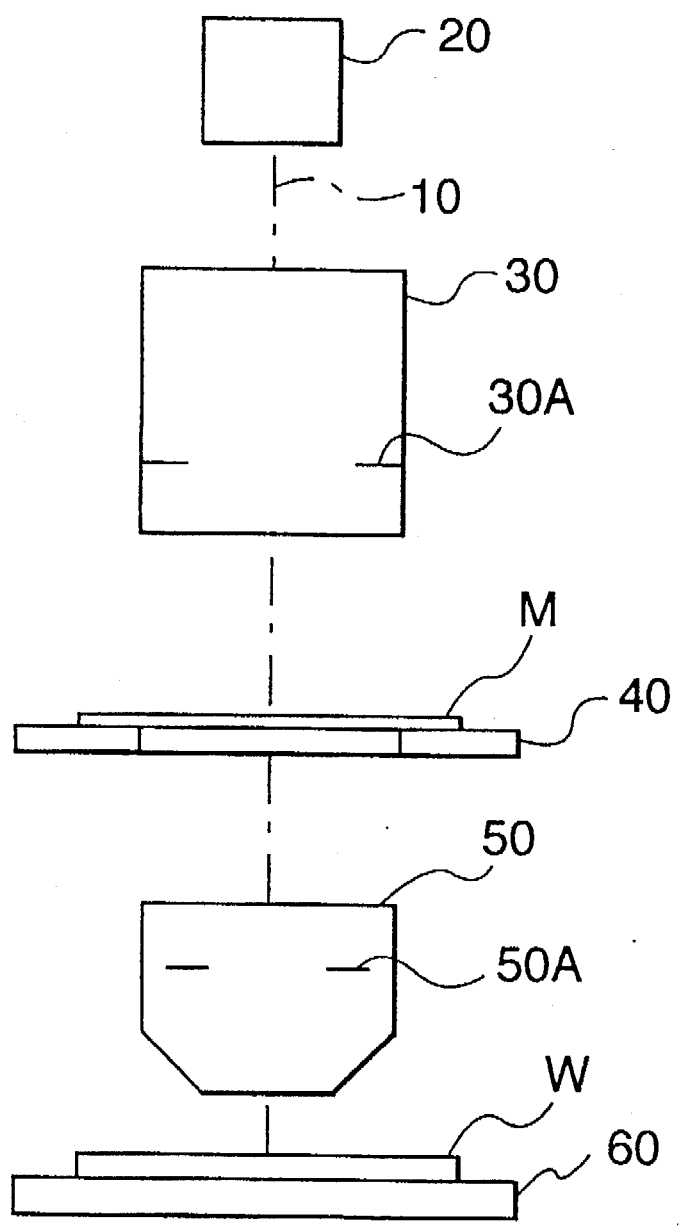
FIG. 10 shows an exposure apparatus having an optical system provided with antireflection film.

FIG. 10 shows a projection exposure apparatus for the manufacture of devices carrying thereon an optical system provided with the above-described antireflection film.

In FIG. 10, the reference numeral 10 designates an optical axis, the reference numeral 20 denotes a light source (central wavelength 365 nm) emitting i-rays, the reference numeral 30 designates an illuminating optical system provided with an aperture stop 30A, the reference numeral 40 denotes a stage on which a reticle M is placed, the reference numeral 50 designates a projection optical system provided with an aperture stop 50A, and the reference numeral 60 denotes a stage on which a wafer W is placed. A near ultraviolet light beam from the light source 20 is applied to the reticle M through the illuminating optical system 30, and the image of the device pattern of the reticle M is projected onto the wafer W by the projection optical system 50.

In the projection exposure apparatus of the present embodiment, the antireflection film of the present invention is formed on both of the lens of the illuminating optical system 30 and the lens of the projection optical system 50, and the reflection of the near ultraviolet light beam on the refracting surfaces of the lenses is prevented by the effect of the antireflection film and the creation of flare light is prevented.

As another embodiment of the projection exposure apparatus, there is one in which the antireflection film of the present invention is formed on only one of the lens of the illuminating optical system 30 and the lens of the projection optical system 50.

Also, in a case where of the antireflection films of the present invention, one having the antireflection effect for both of near ultraviolet light and visible light is used on the lens of the projection optical system 50, when a mark on the wafer W is to be detected by the visible light by the use of an alignment optical system, not shown, through the projection optical system 50, the creation of flare light can be prevented and correct mark detection becomes possible.

<Embodiment of a Device Manufacturing Method>

Description will now be made of a method of manufacturing a device utilizing the projection exposure apparatus of FIG. 10.

Figure 11:
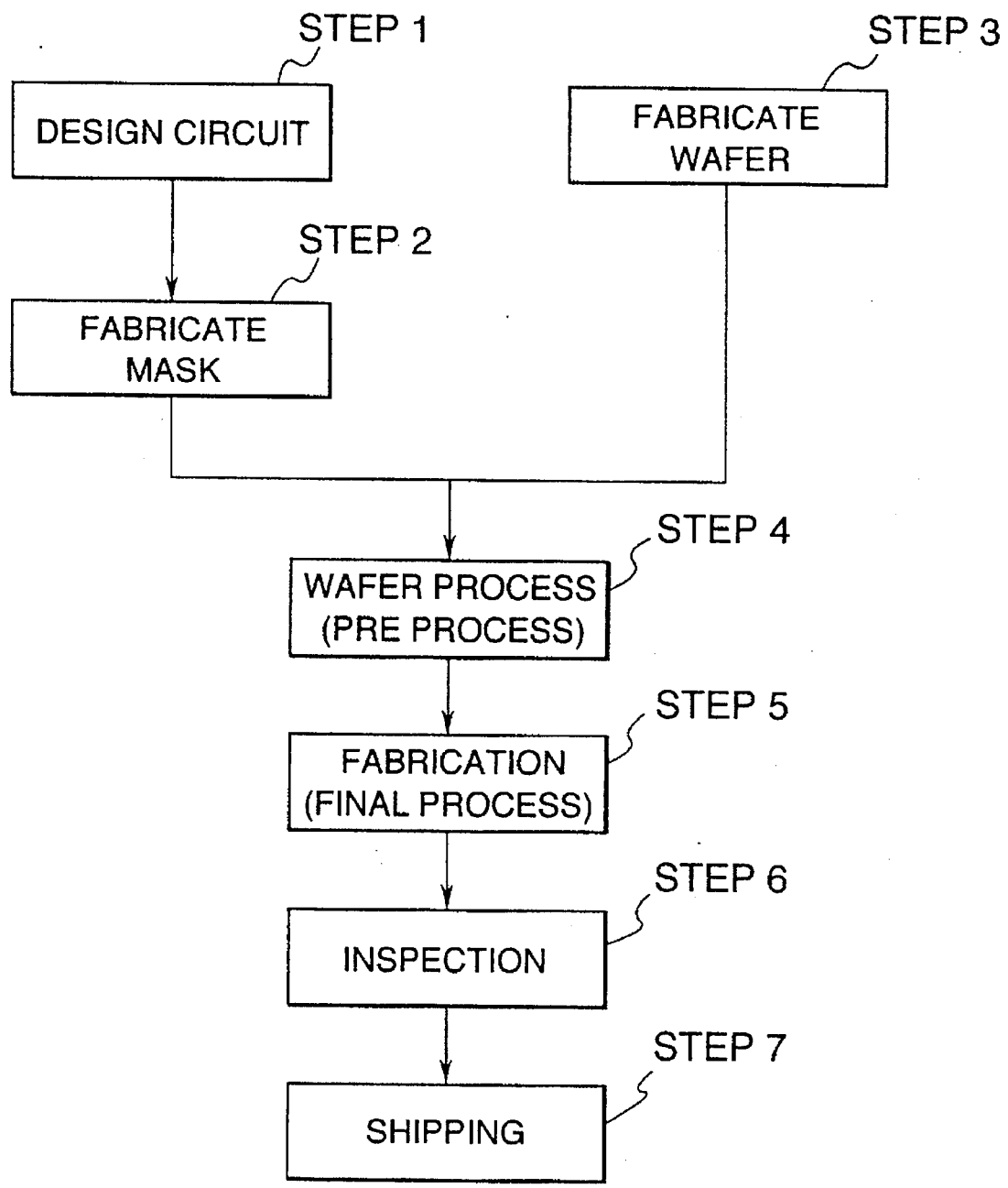
FIG. 11 is a chart showing the flow of the manufacture of a device.

FIG. 11 shows the flow of the manufacture of a semiconductive device (a semiconductor chip such as IC or LSI, a liquid crystal panel or a CCD). At a step 1 (circuit design), the circuit design of the semiconductive device is made. At a step 2 (mask fabrication), a mask (reticle 304) formed with the designed circuit pattern is fabricated. On the other hand, at a step 3 (wafer fabrication), a wafer (wafer 306) is fabricated by the use of a material such as silicon. A step 4 (wafer process) is called a pre-process, and at this step, an actual circuit is formed on the wafer by the lithography technique by the use of the prepared mask and wafer. The next step 5 (fabrication) is called the final process, which is a process for making a chip by the use of the wafer prepared at the step 4, and includes such steps as the assembly step (dicing and bonding) and the packaging step (chip enveloping). At a step 6 (inspection), inspections such as the operation confirmation test and durability test of the semiconductive device prepared at the step 5 are effected. The semiconductive device is completed by way of such steps, and it is shipped (step 7).

Figure 12:
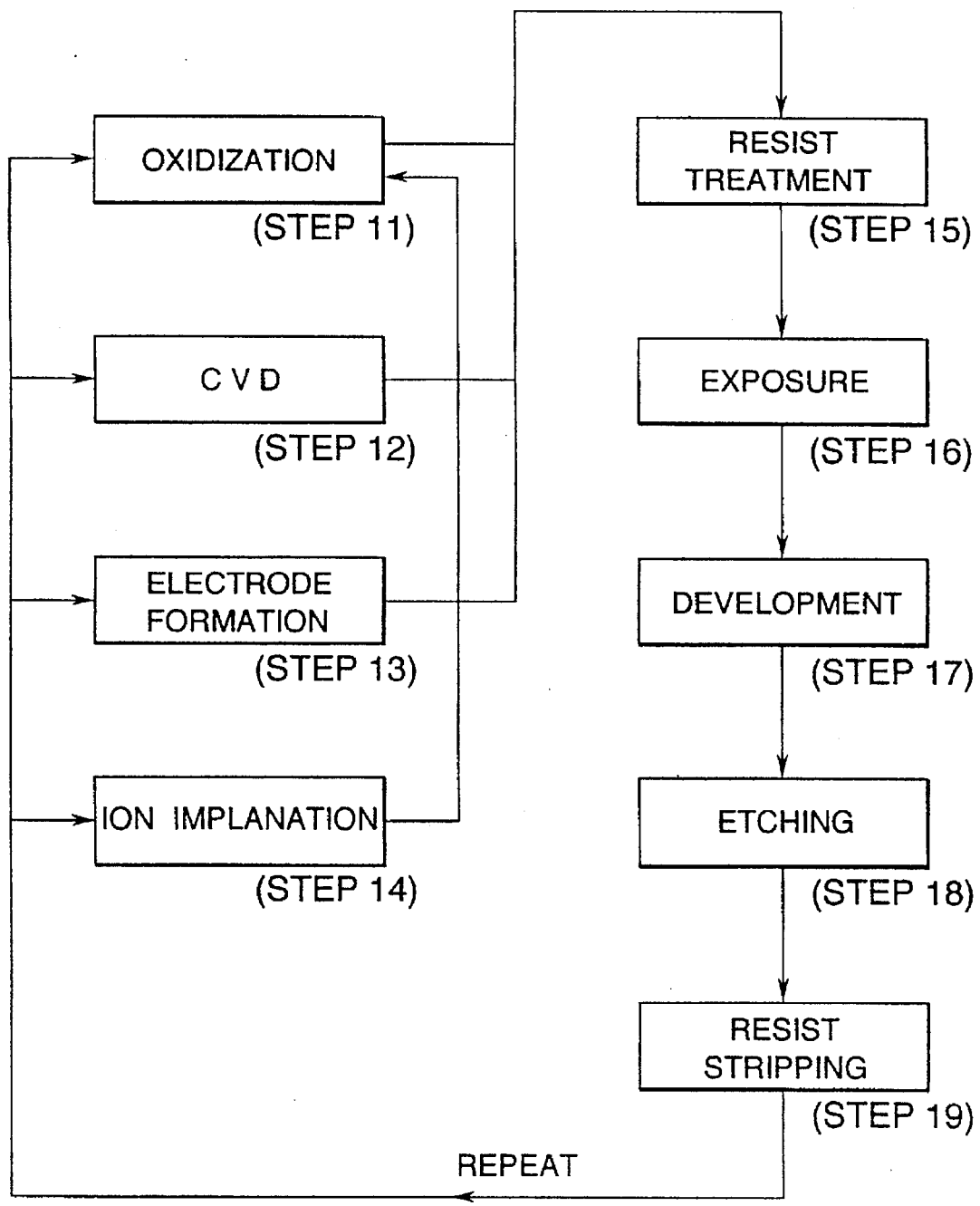
FIG. 12 is a chart showing the wafer process of FIG. 11.

FIG. 12 shows the detailed flow of the above-described wafer process. At a step 11 (oxidization), the surface of the wafer (wafer 306) is oxidized. At a step 12 (CVD), insulating film is formed on the surface of the wafer. At a step 13 (electrode formation), an electrode is formed on the wafer by evaporation. At a step 14 (ion implantation), ions are implanted into the wafer. At a step 15 (resist treatment), resist (sensitive material) is applied to the wafer. At a step 16 (exposure), the wafer is exposed to the circuit pattern of the mask (reticle 304) by the above-described projection exposure apparatus. At a step 17 (development), the exposed wafer is developed. At a step 18 (etching), the other portion than the developed resist is scraped off. At a step 19 (resist stripping), the resist which has become unnecessary after the etching has been terminated is removed. By these steps being repetitively carried out, a circuit pattern is formed on the wafer.

If the manufacturing method of the present embodiment is used, it will become possible to manufacture a device of high degree of integration which has heretofore been difficult to manufacture.

Figure 13:
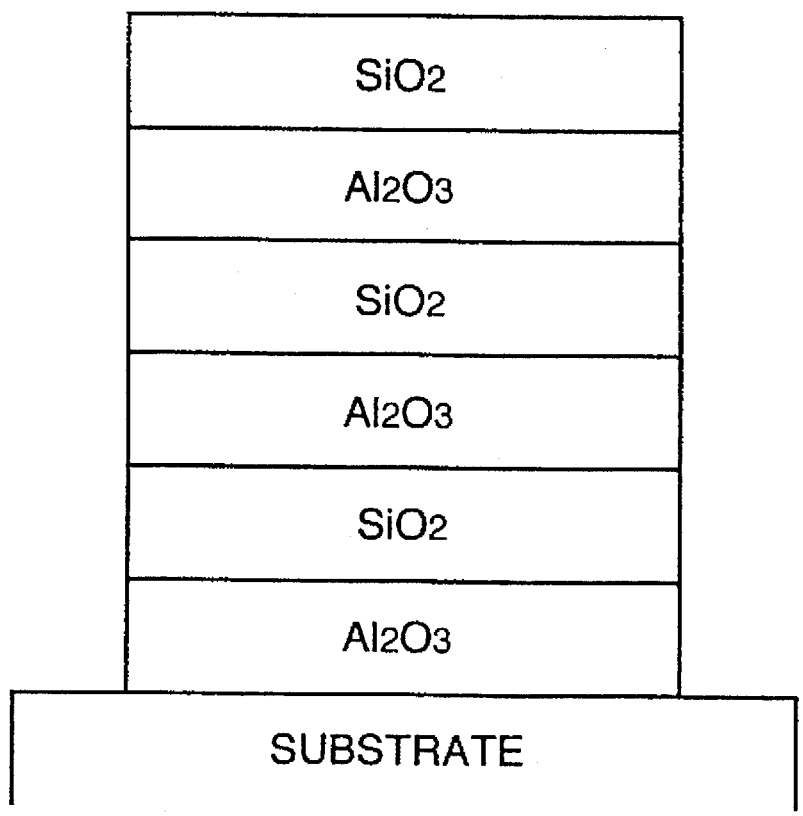
FIG. 13 shows an embodiment of the antireflection film of the present invention.

FIG. 13 is a schematic view showing an embodiment of the antireflection film of the present invention. The antireflection film of the present embodiment is designed to exhibit an antireflection effect for ultraviolet rays and visible light.

As shown in FIG. 13, the antireflection film of the present embodiment has six-layer structure, and uses $SiO_2$ for low refractive index layers and $Al_2O_3$ for high refractive index layers, and the refractive index layers are laminated in the order of low, high, low, high, low and high from the air side to the substrate side.

Also, when the refractive indices of the low refractive index layers and the high refractive index layers for light of wavelength 248 nm are $N_L$ and $N_H$, respectively, the antireflection film of the present embodiment is designed to satisfy the following conditions:

$$1.45 \leq N_L \leq 1.55 \tag{1}$$

$$1.60 \leq N_H \leq 1.80 \tag{2}$$

Further, when the six layers are defined as first to sixth layers and the optical film thicknesses (refractive index x geometrical film thickness) of the first to sixth layers are D1, D2, D3, D4, D5 and D6, respectively, the antireflection film of the present embodiment is preferably designed to satisfy the following conditions:

$$50 \leq D1 \leq 85 \tag{3}$$

$$35 \leq D2 \leq 75 \tag{4}$$

$$45 \leq D3 \leq 75 \tag{5}$$

$$145 \leq D4 \leq 240 \tag{6}$$

$$80 \leq D5 \leq 125 \tag{7}$$

$$75 \leq D6 \leq 120 \tag{8}$$

The antireflection film of the present embodiment uses $SiO_2$ for the low refractive index layers and $Al_2O_3$ for the high refractive index layers and therefore is small in optical absorption. Also, these materials are good in close contact with the substrate.

Also, the antireflection film of the present embodiment has six-layer structure and therefore can make absorption small and yet obtain a good antireflection effect.

Also, by designing the antireflection film so as to satisfy the aforementioned conditions (3) to (8), it is possible to obtain an antireflection effect for both of ultraviolet rays and visible light and widen the antireflection band in the ultraviolet ray area.

Figure 14:
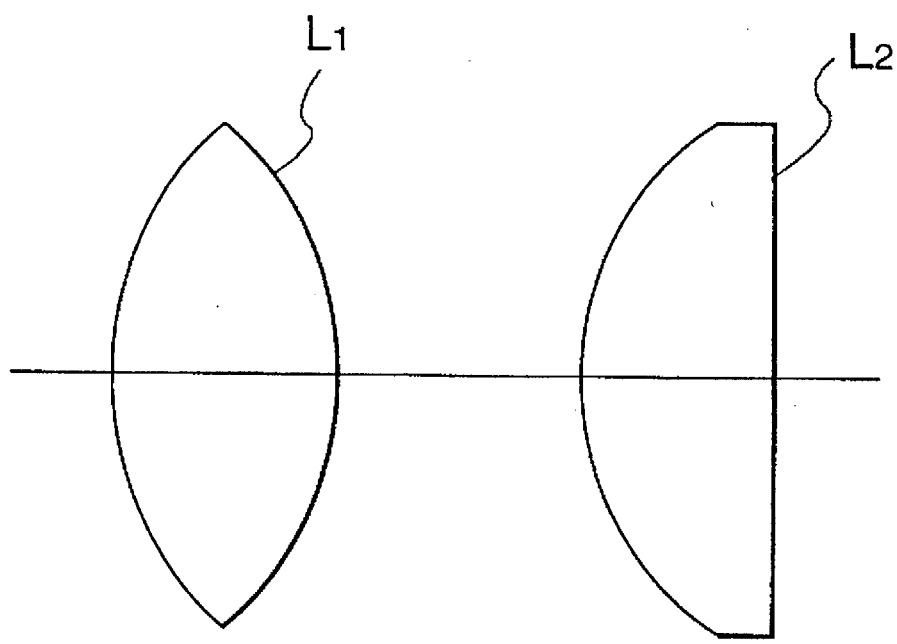
FIG. 14 shows an optical system provided with the antireflection film of the present invention.

Referring to FIG. 14 which is a schematic view showing an optical system in which the antireflection film of the present invention is used, $L_1$ and $L_2$ designate lenses. In FIG. 14, the antireflection film of FIG. 13 is formed on the light incidence and emergence surfaces of the lenses $L_1$ and $L_2$, and the creation of harmful light such as flare light can be suppressed by the effect of this antireflection film and thus, this optical system is an excellent optical system.

The antireflection film of FIG. 13 is formed by forming $SiO_2$ film and $Al_2O_3$ film alternately on a substrate (such as the surface of a lens) by the vacuum evaporation method or the sputtering method. During the film formation, impurities mix with the film in some cases, and, for example, in the case of the sputtering method, $O_2$, N, Ar, etc. mix with the film. However, if the aforementioned conditions (1) and (2) are satisfied, the antireflection effect will hardly be spoiled if impurities mix with each layer.

Specific design examples of the antireflection film of the present invention are shown in Tables 7 to 10 below.

Figure 15:
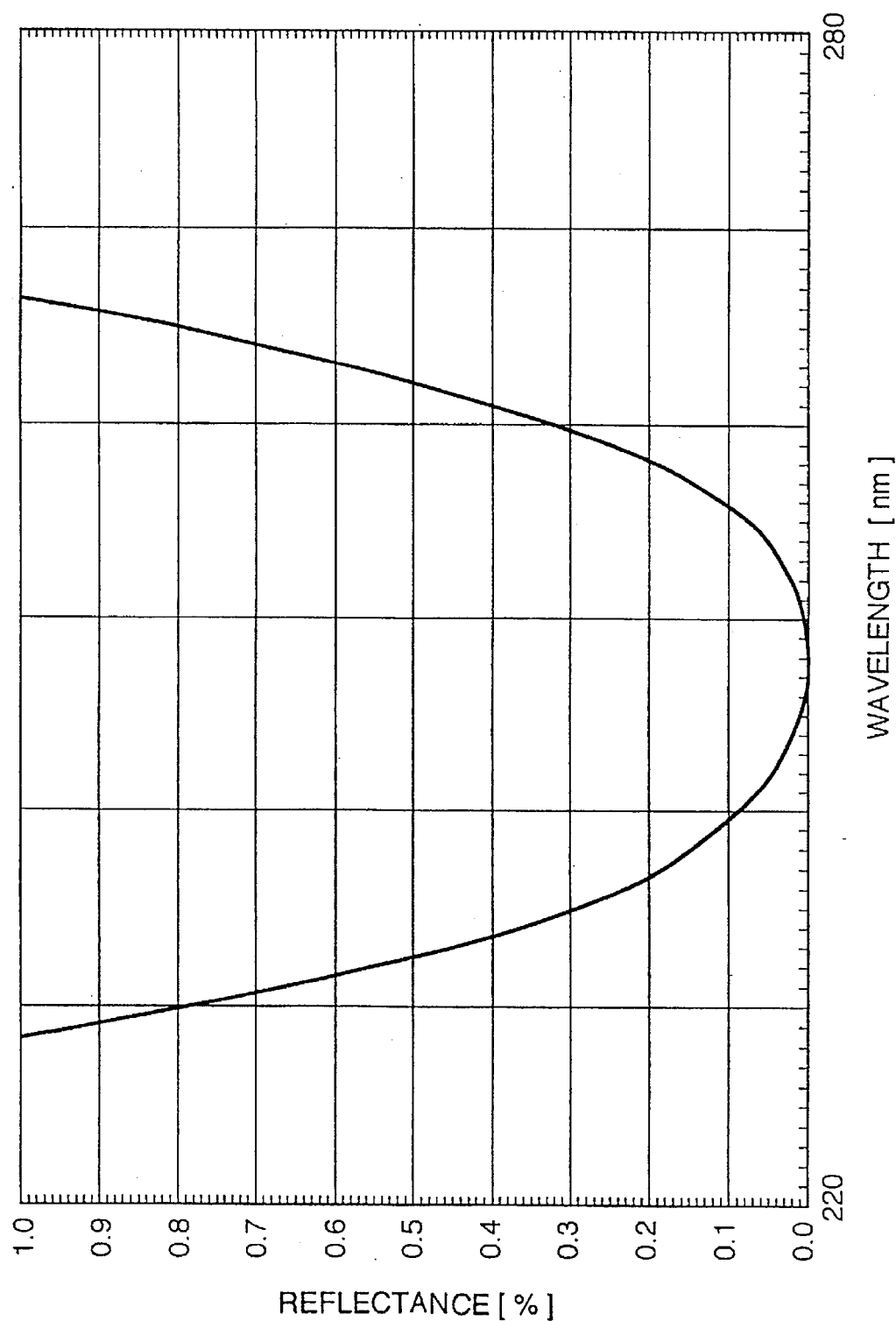
FIG. 15 is a graph showing the reflection characteristic of antireflection film according to a certain design example.

The design example of Table 7 is an example in which antireflection film for ultraviolet light of central wavelength 248 nm is formed on a quartz glass substrate by the use of the vacuum evaporation method, and refractive indices in Table 7 are refractive indices for light of wavelength 248 nm. FIG. 15 is a graph showing the reflection characteristic of this first design example.

Figure 16:
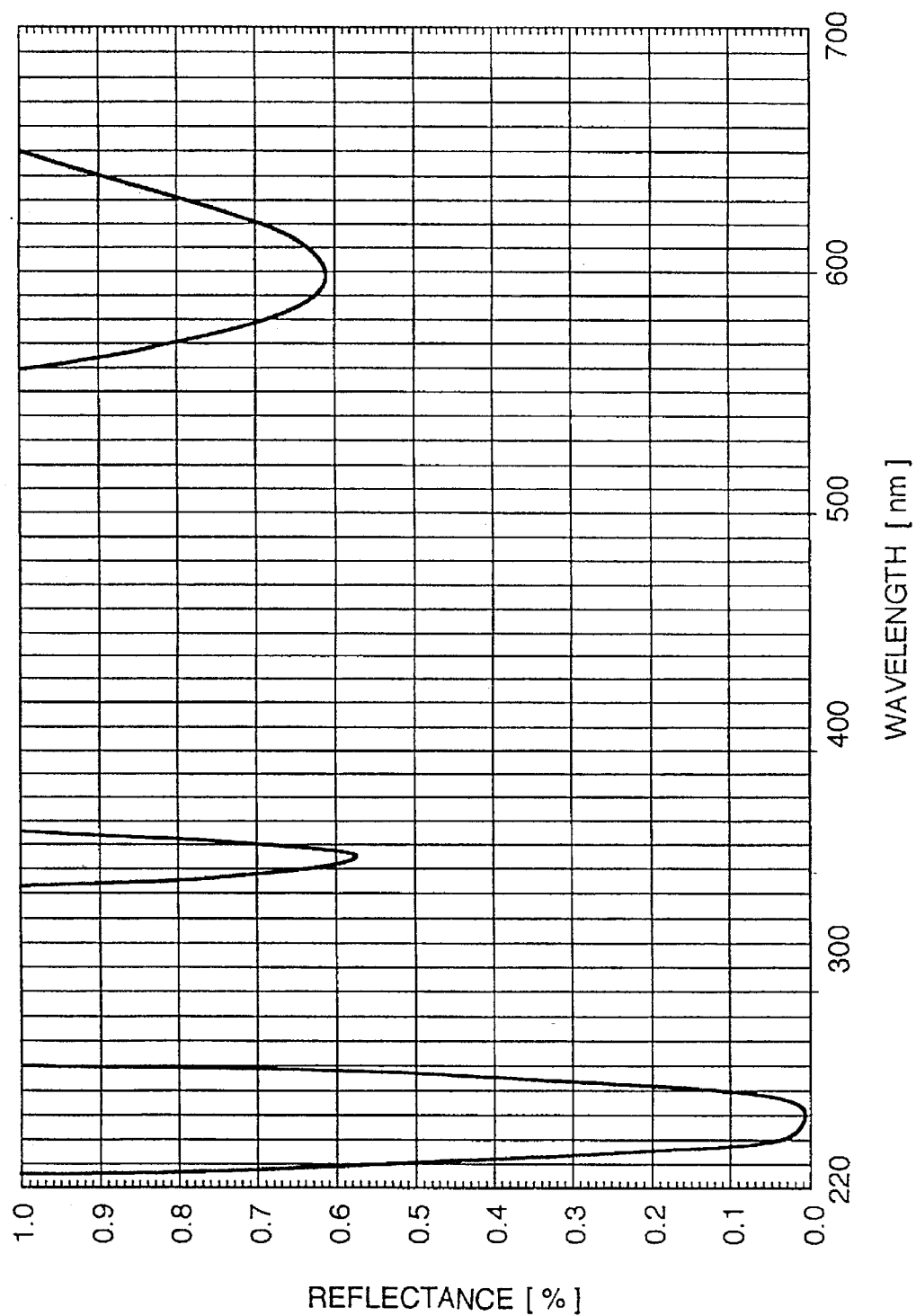
FIG. 16 is a graph showing the reflection characteristic of antireflection film according to another design example.

The design example of Table 8 is an example in which antireflection film for ultraviolet light of central wavelength 248 nm and visible light of wavelengths 550–650 nm is formed on a quartz glass substrate by the use of the vacuum evaporation method, and refractive indices in Table 8 are refractive indices for light of wavelength 248 nm. FIG. 16 is a graph showing the reflection characteristic of this second design example.

Figure 17:
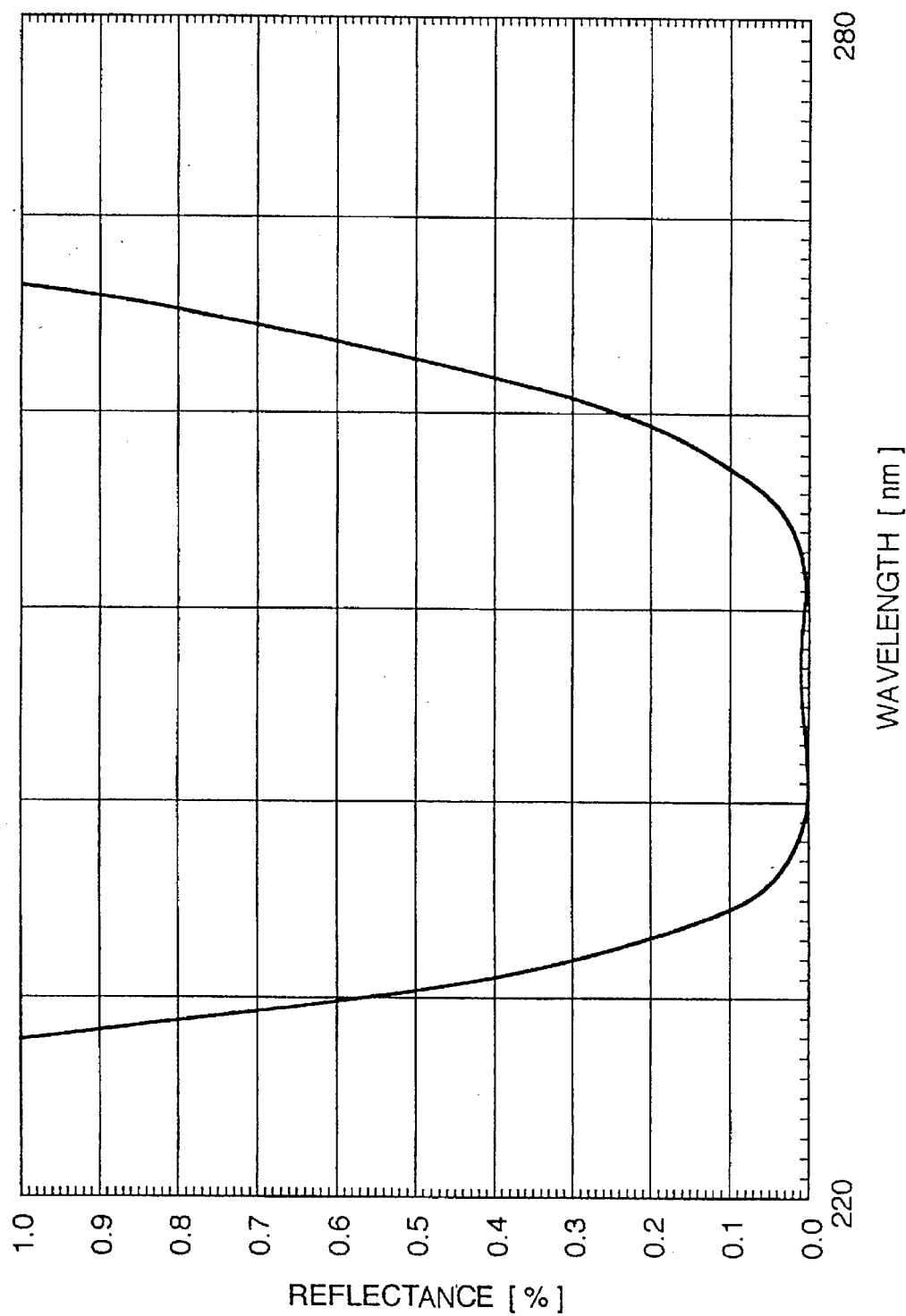
FIG. 17 is a graph showing the reflection characteristic of antireflection film according to another design example.

The design example of Table 9 is an example in which antireflection film for ultraviolet light of central wavelength 248 nm is formed on a quartz glass substrate by the use of the sputtering method, and refractive indices in Table 9 are refractive indices for light of wavelength 248 nm. FIG. 17 is a graph showing the reflection characteristic of this third design example.

Figure 18:
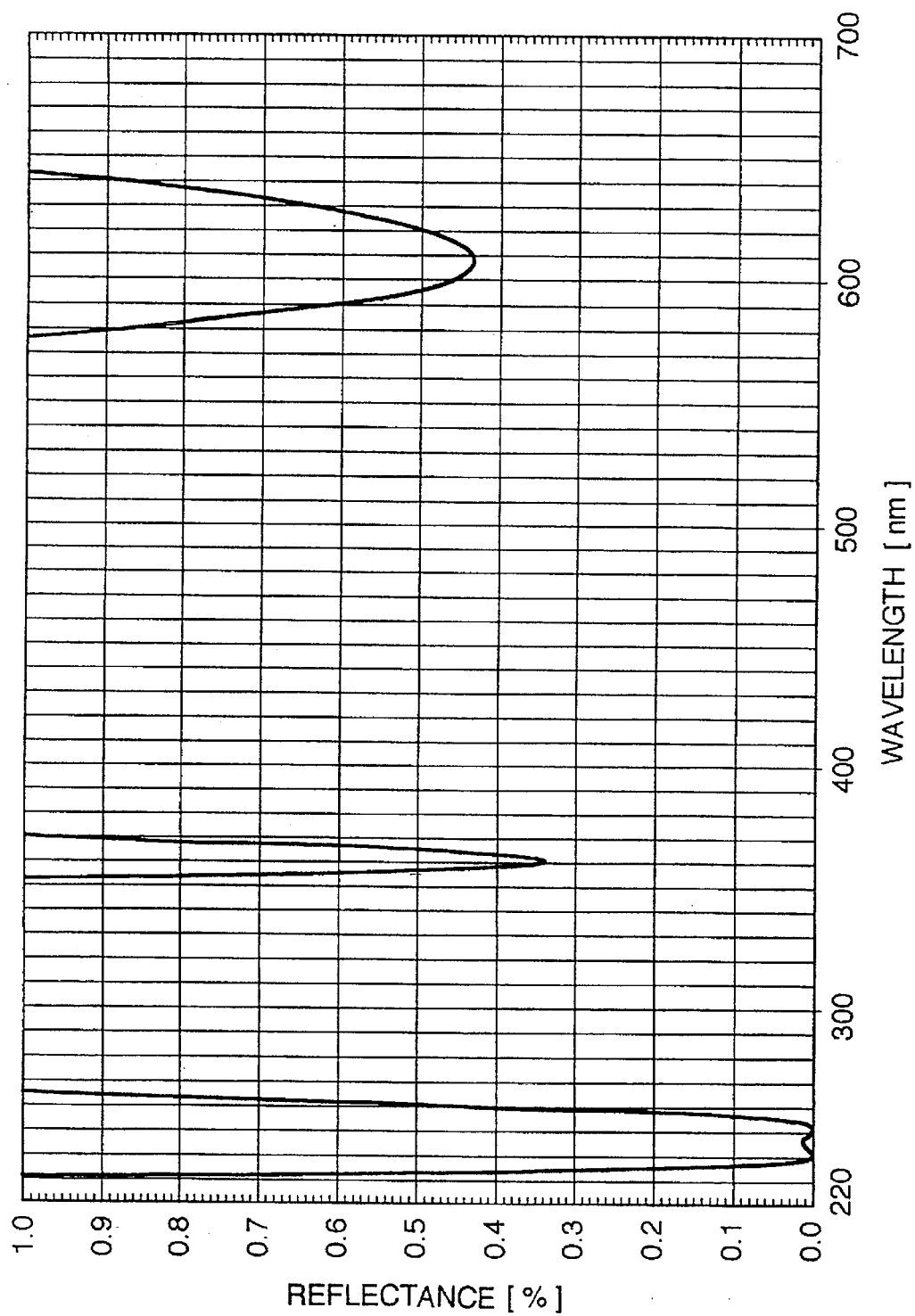
FIG. 18 is a graph showing the reflection characteristic of antireflection film according to another design example.

The design example of Table 10 is an example in which antireflection film for ultraviolet light of central wavelength 248 nm and visible light of wavelengths 550–650 nm is formed on a quartz glass substrate by the use of the vacuum evaporation method, and refractive indices in Table 10 are refractive indices for light of wavelength 248 nm. FIG. 18 is a graph showing the reflection characteristic of this design example.

The antireflection film of each of Tables 7 to 10 has a good antireflection effect as shown in FIGS. 15 to 18. Also, the antireflection film uses $SiO_2$ and $Al_2O_3$ as materials and moreover is of six-layer structure and therefor is small in optical absorption. These materials are also good in close contact with the substrate.

TABLE 7

| | Material | refractive index | optical film thickness |
|---|---|---|---|
| incidence medium | air | 1.000 | |
| 1st layer | $SiO_2$ | 1.488 | 62.308 |
| 2nd layer | $Al_2O_3$ | 1.684 | 60.575 |
| 3rd layer | $SiO_2$ | 1.488 | 56.110 |
| 4th layer | $Al_2O_3$ | 1.684 | 63.882 |
| 5th layer | $SiO_2$ | 1.488 | 97.598 |
| 6th layer | $Al_2O_3$ | 1.584 | 101.324 |
| emergence medium | synthetic quartz | 1.509 | |

TABLE 8

| | Material | refractive index | optical film thickness |
|---|---|---|---|
| incidence medium | air | 1.000 | |
| 1st layer | $SiO_2$ | 1.488 | 62.293 |
| 2nd layer | $Al_2O_3$ | 1.684 | 60.058 |
| 3rd layer | $SiO_2$ | 1.488 | 60.879 |
| 4th layer | $Al_2O_3$ | 1.684 | 184.318 |
| 5th layer | $SiO_2$ | 1.488 | 103.335 |
| 6th layer | $Al_2O_3$ | 1.684 | 99.534 |
| emergence medium | synthetic quartz | 1.509 | |

TABLE 9

| | Material | refractive index | optical film thickness |
|---|---|---|---|
| incidence medium | air | 1.000 | |
| 1st layer | $SiO_2$ | 1.498 | 62.275 |
| 2nd layer | $Al_2O_3$ | 1.764 | 61.603 |

TABLE 9-continued

| | Material | refractive index | optical film thickness |
|---|---|---|---|
| 3rd layer | SiO$_2$ | 1.498 | 51.655 |
| 4th layer | Al$_2$O$_3$ | 1.764 | 73.817 |
| 5th layer | SiO$_2$ | 1.498 | 104.385 |
| 6th layer | Al$_2$O$_3$ | 1.764 | 88.068 |
| emergence medium | synthetic quartz | 1.509 | |

TABLE 10

| | Material | refractive index | optical film thickness |
|---|---|---|---|
| incidence medium | air | 1.000 | |
| 1st layer | SiO$_2$ | 1.498 | 71.084 |
| 2nd layer | Al$_2$O$_3$ | 1.764 | 42.757 |
| 3rd layer | SiO$_2$ | 1.498 | 63.264 |
| 4th layer | Al$_2$O$_3$ | 1.764 | 198.161 |
| 5th layer | SiO$_2$ | 1.498 | 102.616 |
| 6th layer | Al$_2$O$_3$ | 1.764 | 93.740 |
| emergence medium | synthetic quartz | 1.509 | |

Figure 19:
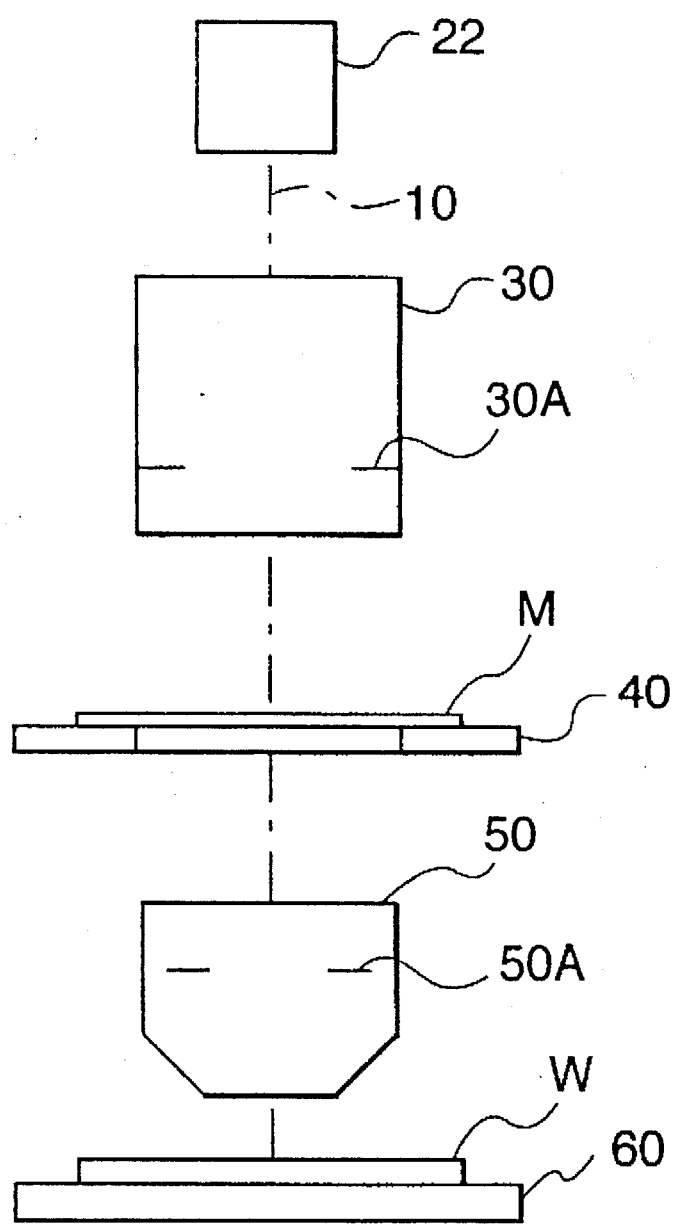
FIG. 19 shows a projection exposure apparatus having an optical system provided with the antireflection film of the present invention.

FIG. 19 shows a projection exposure apparatus for the manufacture of devices carrying thereon an optical system provided with the antireflection film of the present invention.

In FIG. 19, the reference numeral 10 designates an optical axis, the reference numeral 22 denotes an excimer laser (oscillation wavelength 248 nm), the reference numeral 30 designates an illuminating optical system provided with an aperture stop 30A, the reference numeral 40 denotes a stage on which a reticle M is placed, the reference numeral 50 designates a projection optical system provided with an aperture stop 50A, and the reference numeral 60 denotes a stage on which a wafer W is placed. An ultraviolet laser beam from the laser 20 is applied to the reticle M through the illuminating optical system 30, and the image of the device pattern of the reticle M is projected onto the wafer W by the projection optical system 50.

In the projection exposure apparatus of the present embodiment, the antireflection film of the present invention is formed on both of the lens of the illuminating optical system 30 and the lens of the projection optical system 50, and the reflection of the ultraviolet laser beam on the refracting surfaces of the lenses is prevented by the effect of the antireflection film and the creation of flare light is prevented.

As another embodiment of the projection exposure apparatus, there is one in which the antireflection film of the present invention is formed on only one of the lens of the illuminating optical system 30 and the lens of the projection optical system 50.

Also, in a case where of the antireflection films of the present invention, one having an antireflection effect for both of ultraviolet rays and visible light is used on the lens of the projection optical system 50, when a mark on the wafer W is to be detected by the visible light by the use of an alignment optical system, not shown, through the projection optical system 50, the creation of flare light can be prevented and correct mark detection becomes possible.

Description will now be made of an embodiment of a device manufacturing method utilizing the projection exposure apparatus of FIG. 19.

FIG. 11 shows the flow of the manufacture of a semiconductive device (a semiconductor chip such as IC or LSI, a liquid crystal panel or a CCD). At a step 1 (circuit design), the circuit design of the semiconductive device is effected. At a step 2 (mask fabrication), a mask (reticle 304) formed with the designed circuit pattern is fabricated. On the other hand, at a step 3 (wafer fabrication), a wafer (wafer 306) is fabricated by the use of a material such as silicon. A step 4 (wafer process) is called the preprocess, in which an actual circuit is formed on the wafer by the lithography technique by the use of the prepared mask and wafer. The next step 5 (fabrication) is called the final process which is a process for making a chip by the use of the wafer prepared at the step 4, and includes steps such as the assembly step (dicing and boding), and the packaging step. At a step 6 (inspection), inspections such as the operation confirmation test and durability test of the semiconductive device prepared at the step 5 are carried out. The semiconductive device is completed by way of such steps and it is shipped (step 7).

FIG. 12 shows the detailed flow of the above-described wafer process. At a step 11 (oxidization), the surface of the wafer (wafer 306) is oxidized. At a step 12 (CVD), insulating film is formed on the surface of the wafer. At a step 13 (electrode formation), an electrode is formed on the wafer by evaporation. At a step 14 (ion implantation), ions are implanted into the wafer. At a step 15 (resist treatment), resist (sensitive material) is applied to the wafer. At a step 16 (exposure), the wafer is exposed to the image of the circuit pattern of the mask (reticle 304) by the above-described projection exposure apparatus. At a step 17 (development), the exposed wafer is developed. At a step 18 (etching), the other portion than the developed resist is scraped off. At a step 19 (resist stripping), the resist which has become unnecessary after the etching has been terminated is removed. By these steps being repetitively carried out, a circuit pattern is formed on the wafer.

The invention may be embodied in other specific forms without departing from the spirit or essential characteristics thereof. The above-described embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An antireflection film for use for light of wavelengths 200 nm to 400 nm, having four-layer structure, and wherein of said four layers, first and third layers in succession from the air side are low refractive index layers having SiO$_2$, and second and fourth layers are high refractive index layers having Ta$_2$O$_5$, and when the optical film thicknesses (refractive index×geometrical film thickness, measured in nanometers) of said first to fourth layers are D1, D2, D3 and D4, respectively, the following conditions are satisfied:

$74 \leq D1 \leq 112$ $85 \leq D2 \leq 128$ $15 \leq D3 \leq 31$ $27 \leq D4 \leq 47$.

2. An antireflection film for use for light of wavelengths 200 nm to 400 nm having six-layer structure, wherein of said six layers, first and third layers in succession from the air side are low refractive index layers having SiO$_2$, second, fourth and sixth layers are high refractive index layers having Ta$_2$O$_5$, and a fifth layer is a layer having Al$_2$O$_3$.

3. The antireflection film of claim 2, wherein the refractive index N$_M$ of said fifth layer satisfies $1.59 \leq N_M \leq 1.65$.

4. The antireflection film of claim 2, wherein when the optical film thicknesses (refractive index×geometrical film thickness, measured in nanometers) of said first to sixth layers are D1, D2, D3, D4, D5 and D6, respectively, the following conditions are satisfied:

$80 \leq D1 \leq 128$ $52 \leq D2 \leq 88$ $11 \leq D3 \leq 20$ $112 \leq D4 \leq 172$ $20 \leq D5 \leq 42$ $22 \leq D6 \leq 38$.

5. An exposure apparatus using exposure light of wavelengths 200 nm to 400 nm having:

an optical system; and antireflection film formed on the refracting surface of said optical system, said antireflection film having a high refractive index layer having six-layer structure, wherein of said six layers, first and third layers in succession from the air side are low refractive index layers having $SiO_2$, second, fourth, and sixth layers are high refractive index layers having $Ta_2O_5$, and a fifth layer is a layer having $Al_2O_3$.

6. Antireflection film for use for light of wavelengths 200 nm to 400 nm having six-layer structure and wherein of said six layers, first, third and fifth layers in succession from the air side are low refractive index layers having $SiO_2$, and second, fourth, and sixth layers are high refractive index layers having $Al_2O_3$, and wherein when the optical film thicknesses (refractive index×geometrical film thickness, measured in nanometers) of said first to sixth layers are D1, D2, D3, D4, D5, and D6, respectively, the following conditions are satisfied:

$50 \leq D1 \leq 85$ $35 \leq D2 \leq 75$ $45 \leq D3 \leq 75$ $145 \leq D4 \leq 240$ $80 \leq D5 \leq 125$ $75 \leq D6 \leq 120$.

7. An exposure apparatus using exposure light of wavelengths 200 nm to 400 nm having:

an optical system; and antireflection film formed on the refracting surface of said optical system, said antireflection film having six-layer structure and wherein of said six layers, first, third and fifth layers in succession from the air side are low refractive index layers having $SiO_2$, and second, fourth and sixth layers are high refractive index layers having $Al_2O_3$, and wherein when the optical film thicknesses (refractive index×geometrical film thickness, measured in nanometers) of said first to sixth layers are D1, D2, D3, D4, D5, and D6, respectively, the following conditions are satisfied:

$50 \leq D1 \leq 85$ $35 \leq D2 \leq 75$ $45 \leq D3 \leq 75$ $145 \leq D4 \leq 240$ $80 \leq D5 \leq 125$ $75 \leq D6 \leq 120$.

* * * * *

UNITED STATES PATENT AND TRADEMARK OFFICE
CERTIFICATE OF CORRECTION

PATENT NO. : 5,661,596
DATED : August 26, 1997
INVENTOR(S) : RYUJI BIRO, ET AL.

It is certified that error appears in the above-identified patent and that said Letters Patent is hereby corrected as shown below:

SHEET 12 OF THE DRAWINGS:

Figure 12, "IMPLANATION" should read --IMPLANTATION--.

COLUMN 5:

Line 43, "Al$_2$O$_3$ film" should read --Al$_2$O$_3$ film--.

COLUMN 6:

Line 30, "Ta$_2$O$_{51}$" should read --Ta$_2$O$_5$--; and
Line 40, "Ta$_2$O$_2$," should read --Ta$_2$O$_5$,--.

Signed and Sealed this

Nineteenth Day of May, 1998

Attest:

BRUCE LEHMAN

*Attesting Officer*     *Commissioner of Patents and Trademarks*